United States Patent
Man et al.

(10) Patent No.: US 8,604,984 B2
(45) Date of Patent: *Dec. 10, 2013

(54) MOBILE WIRELESS COMMUNICATIONS DEVICE WITH SELECTIVE ANTENNA LOAD SWITCHING AND RELATED METHODS

(71) Applicant: Research In Motion Limited, Waterloo (CA)

(72) Inventors: Ying Tong Man, Waterloo (CA); Yihong Qi, Waterloo (CA); Krystyna Bandurska, Waterloo (CA); Adrian Matthew Cooke, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/732,726

(22) Filed: Jan. 2, 2013

(65) Prior Publication Data
US 2013/0122976 A1    May 16, 2013

Related U.S. Application Data

(63) Continuation of application No. 12/183,223, filed on Jul. 31, 2008, now Pat. No. 8,378,898.

(60) Provisional application No. 61/051,432, filed on May 8, 2008.

(51) Int. Cl.
*H01Q 1/24*   (2006.01)
*H01Q 3/24*   (2006.01)

(52) U.S. Cl.
USPC .......................................... 343/702; 343/876

(58) Field of Classification Search
USPC ........................................ 343/702, 725, 876
See application file for complete search history.

(56) References Cited

U.S. PATENT DOCUMENTS

| | | | |
|---|---|---|---|
| 6,816,711 | B2 | 11/2004 | Standke et al. |
| 6,920,315 | B1 | 7/2005 | Wilcox et al. |
| 7,058,434 | B2 | 6/2006 | Wang et al. |
| 7,486,975 | B2 | 2/2009 | Mori |
| 2005/0009586 | A1 | 1/2005 | Mori |
| 2007/0152892 | A1 | 7/2007 | Chiang et al. |
| 2010/0127944 | A1 | 5/2010 | Breiter |

FOREIGN PATENT DOCUMENTS

| | | |
|---|---|---|
| EP | 1770875 | 4/2007 |
| EP | 1841006 | 10/2007 |
| WO | 2004001898 | 12/2003 |
| WO | 2004021511 | 3/2004 |
| WO | 2006112255 | 10/2006 |
| WO | 2008001384 | 1/2008 |

*Primary Examiner* — Robert Karacsony
(74) *Attorney, Agent, or Firm* — Allen, Dyer, Doppelt, Milbrath & Gilchrist, P.A.

(57) ABSTRACT

A mobile wireless communications device may include at least two antennas having a different structure. The device may also include wireless transceivers, a load(s), signal processing circuitry, and a controller. The controller may be for selectively switching the signal processing circuitry to a desired one of the wireless transceivers, selectively switching a desired one of the antennas to the desired one of the wireless transceivers, and selectively switching a different one of the antennas to at least one of the loads.

20 Claims, 10 Drawing Sheets

MOBILE WIRELESS COMMUNICATIONS DEVICE WITH SELECTIVE ANTENNA LOAD SWITCHING AND RELATED METHODS

FIELD OF THE INVENTION

The present invention relates to the field of wireless communications devices, and, more particularly, to antenna systems for mobile wireless communications devices and related methods.

BACKGROUND OF THE INVENTION

Cellular communications systems continue to grow in popularity and have become an integral part of both personal and business communications. Cellular telephones allow users to place and receive voice calls most anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Even so, as the functionality of cellular communications devices continues to increase, so too does the demand for smaller devices which are easier and more convenient for users to carry. One challenge this poses for cellular device manufacturers is designing antennas that provide desired operating characteristics within the relatively limited amount of space available for the antenna.

External cell phone antennas are advantageous in that they are spaced apart from the user's head, which makes it easier for phone manufacturers to comply with applicable specific absorption rate (SAR) requirements, for example. This is because the farther the radiating element of the cell phone antenna system is from the user, the lower the radiation exposure to the user. Yet, many users prefer internal antennas over external antennas, as external antennas are prone to catch on objects and become damaged, for example. Yet, with the ever increasing trend towards smaller cell phone sizes, for a relatively small phone having an internal antenna, this may place the antenna in relatively close proximity to the user's ear, which may make complying with applicable SAR and/or hearing aid compatibility (HAC) requirements potentially difficult for manufacturers. Further, the reduced space for the antenna may make achieving desired signal characteristics difficult.

One exemplary mobile phone configuration that attempts to address radiation concerns from an internal antenna is set forth in PCT Publication No. WO/2004/021511 A2. The device includes a casing including a first in-built driven antenna element extending a length along a longest side of the casing. Either the portable communication device or the case includes at least one passive beam directive element distanced from and generally extending along at least most of the same length as the first in-built driven antenna element. Because of this, electromagnetic radiation generated by the first in-built driven antenna element is enhanced in a direction away from a side of the casing intended to be facing a user.

Another mobile phone device is disclosed in U.S. Pat. No. 6,920,315 to Wilcox et al. The phone includes multiple radios and multiple antennas located in close proximity to each other, and uses a parallel tuning circuit to optimize the isolation between the antennas. The parallel tuning circuit can include multiple impedance matching circuits to match the impedance in multiple frequency bands or isolating antennas.

Despite the existence of such configurations, further improvements may be desirable in certain applications, particularly where the form factor of the device housing does not provide adequate space for such arrangements. Moreover, as cellular wireless communication systems continue to improve, there is a need for relatively high performance multi-band antennas for operation in EDGE, CDMA and/or WCDMA systems, for example.

DETAILED DESCRIPTION OF THE PREFERRED EMBODIMENTS

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in alternative embodiments.

Generally speaking, a mobile wireless communications device is disclosed herein which may include a plurality of antennas having different structures. The device may also include a plurality of wireless transceivers, a plurality of loads, signal processing circuitry, and a controller. The controller may be for selectively switching the signal processing circuitry to a desired one of the wireless transceivers, selectively switching a desired one of the antennas to the desired one of the wireless transceivers, and selectively switching a different one of the antennas to at least one of the loads.

More particularly, at least one of the antennas may be a monopole antenna. Also, at least one of the antennas may be an inverted F antenna. Moreover, at least one of the antennas may be a multi-band Global System for Mobile Communications (GSM) antenna. One or more of the antennas may also be a wideband code-division multiple access (WCDMA) frequency division duplex (FDD) band antenna. In addition, the controller may also selectively switch the different one of the antennas to an unused one of the wireless transceivers.

The device may further include a portable housing, and the antennas may be carried on an inner surface of the portable housing. Furthermore, the device may also include a printed circuit board (PCB) carried by the portable housing, and the wireless transceivers, the plurality of loads, the signal processing circuitry, and the controller may be carried on the PCB. Also, the housing may have opposing top and bottom ends and opposing first and second sides, and at least one of the antennas may extend from the bottom end vertically upward toward the top end along at least one of the first and second sides. Further, at least one of the antennas may be carried adjacent the bottom end of the portable housing.

By way of example, the plurality of loads may comprise a plurality of impedance elements. Also, the plurality of loads may include at least one respective load for each of the antennas.

A method for operating a mobile wireless communications device, such as the one described briefly above, may include using a controller to selectively switch the signal processing circuitry to a desired one of the wireless transceivers, and selectively switch a desired one of the antennas to the desired one of the wireless transceivers. The method may further include using the controller to selectively switch a different one of the antennas to at least one of the loads.

Figure 1:
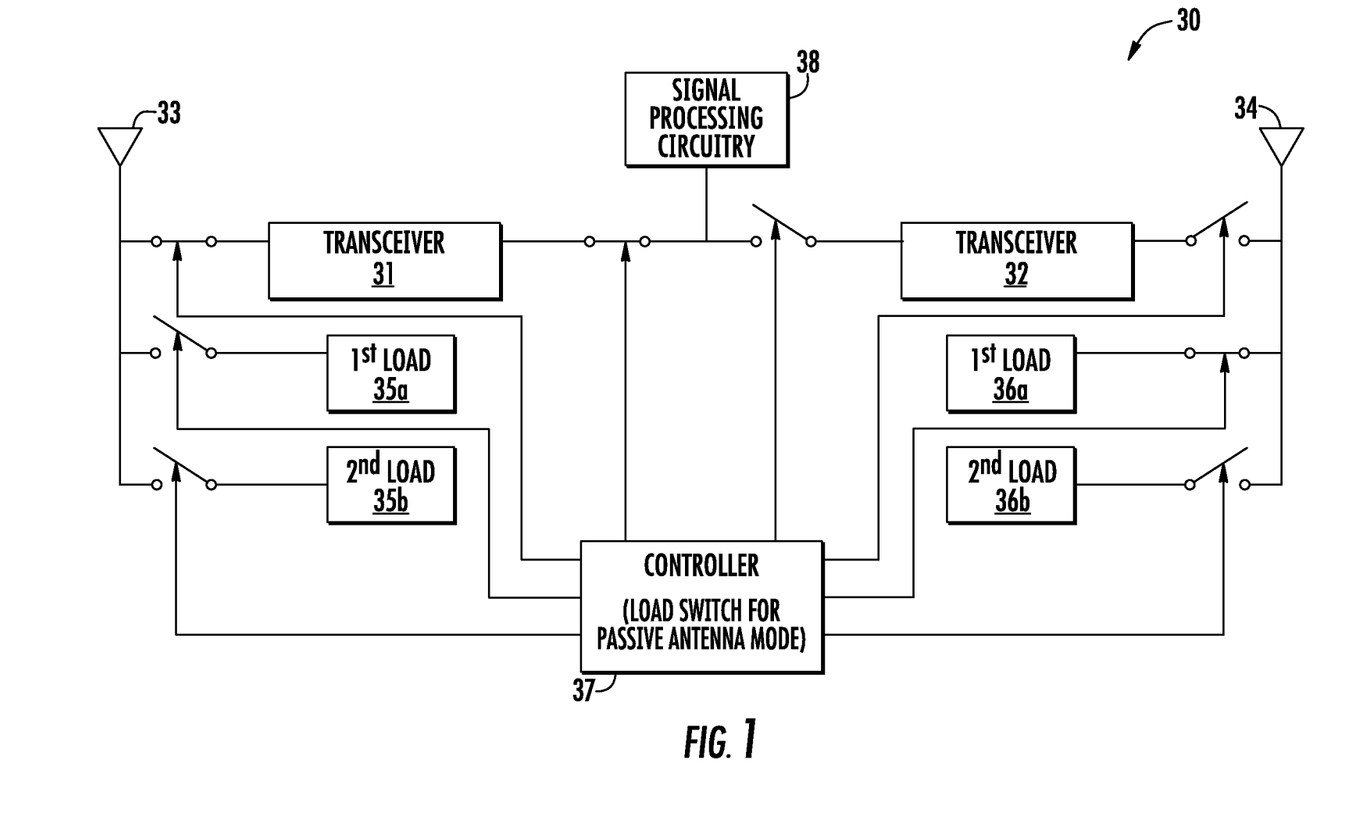
FIG. 1 is schematic block diagram of a mobile wireless communications device in accordance with one exemplary embodiment.
Figure 2:
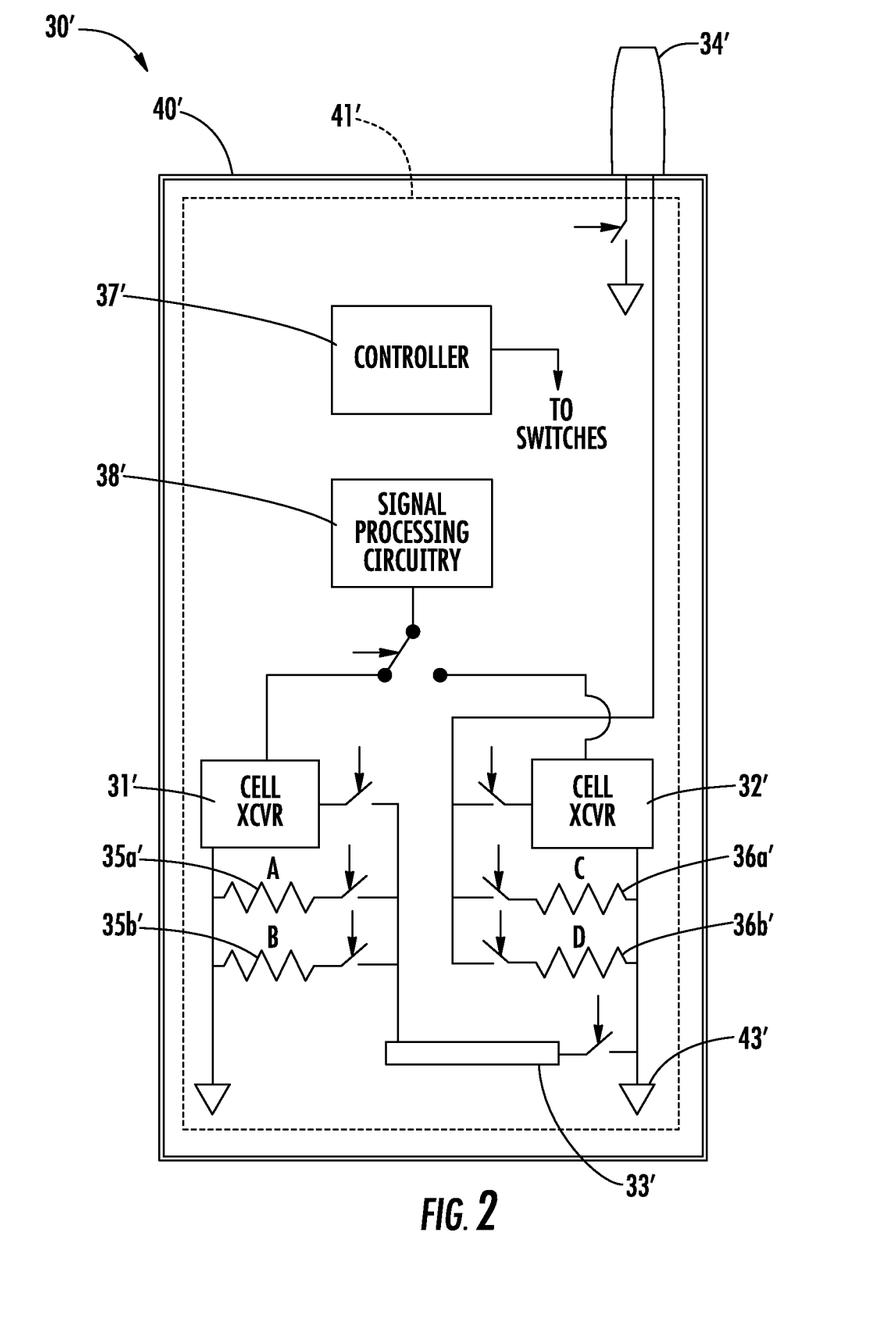
FIG. 2 is schematic block diagram of a cellular implementation of the mobile wireless communications device of FIG. 1.
Figure 3:
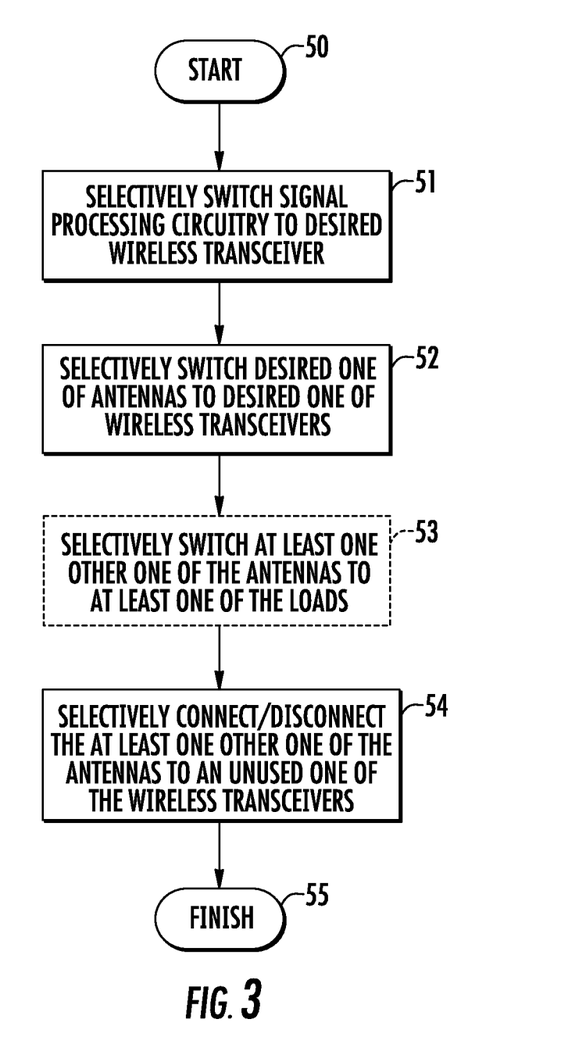
FIG. 3 is a flow diagram illustrating method aspects for using the mobile wireless communications device of FIG. 1.

Referring now to FIGS. 1 through 3, a mobile wireless communications device 30, such as a cellular and/or wireless local area network (WLAN) device, for example, illustratively includes a multi-band antenna system. However, it should be noted that multi-band operation need not be required in all embodiments, and other wireless communications formats may also be used. The antenna system may be conceptually considered as a variable loading multi-band, multi-antenna system in that it may provide relatively wide bandwidth and high system antenna gain by using a non-active antenna element(s) as a passive or parasitic element(s) for an active antenna element(s).

More particularly, the device 30 illustratively includes first and second wireless transceivers 31, 32 (e.g., cellular, WLAN, etc.), each of which has one or more respective antenna elements 33, 34 associated therewith. In the example shown in FIG. 2, the antenna 33' is an internal element and, more particularly, a printed circuit element on a printed circuit board (PCB) 41' within a portable handheld housing 40'. However, such internal elements may take other forms such as flex circuits, and may be carried on an inside surface of the housing 40' within the device 30' instead of the PCB 41', and such internal elements need not be printed conductors in all embodiments (e.g., they may include wires, metal structures, etc.), as will be appreciated by those skilled in the art. In the exemplary embodiment, the antenna 33' is a monopole antenna coupled between the cellular transceiver (XCVR) 31' and a signal ground 43', but other suitable antenna types (e.g., inverted F, etc.) may also be used, as will be discussed further below.

Also in the illustrated example, the antenna 34' is an external antenna. That is, the antenna 34' is at least partially carried on an outer surface of the housing 40'. While both an internal and an external antenna are shown in the example of FIG. 2, it should be noted that various combinations of antenna types may be used, e.g., all of the antennas may be internal, all may be external, or a combination of internal and external antennas may be used.

Additionally, the antenna 33' is illustratively positioned at the bottom of the device 30' (e.g., where the input microphone would typically be located in a cellular phone) to further space the antenna element away from the user's brain and ear for SAR reduction and/or HAC compatibility, respectively. However, the antenna elements 33', 34' may be positioned elsewhere from the locations shown in the exemplary embodiment. The antenna elements 33', 34' may be single or multiple-feed antennas depending upon the given configuration and/or application, as will be appreciated by those skilled in the art.

Beginning at Block 50, a controller 37 selectively switches signal processing circuitry 38 (i.e., the circuitry which processes the information received or to be transmitted) to a desired one of the transceivers 31 and 32 depending upon the given operating configuration, at Block 51. For example, the transceiver/antenna pair 31, 33 may be for operation in a first operating frequency band(s), while the transceiver/antenna pair 32, 34 is for operation in a second (i.e., different) operating frequency band(s), as will be appreciated by those skilled in the art. Thus, by switching between the transceivers 31, 32, the controller 37 causes a respective one of the antenna elements 33, 34 to be the active element (i.e., the main radiating element) and the other to be a passive or parasitic element, as will be appreciated by those skilled in the art. Other dedicated parasitic elements (i.e., not connected to a transceiver) may also be used in some embodiments, if desired.

The controller 37 also selectively switches a desired one of the antennas 33, 34 to a desired one of the wireless transceivers 31, 32, at Block 52. In the illustrated example, the controller 37 switches the antenna 33 to the transceiver 31 and the signal processing circuitry 38, making the antenna 33 the active antenna. However, in some embodiments different antennas could be switched to different transceivers, e.g., either of the antennas 33, 34 could be switched to either of the transceivers 31 or 32, if desired, although this additional switching flexibility is not shown in the drawings for clarity of illustration.

Also associated with each of the antenna elements 33, 34 in the illustrated example are respective sets of first and second loads 35a, 35b and 36a, 36b. The controller 37 further selectively switches either one or both of the first and second loads 35a, 35b to the antenna element 33 when it is in the passive mode, and the same is true for the first and second loads 36a, 36b when the antenna element 34 is in the passive mode, at Block 53. The first and second loads 35a, 35b and 36a, 36b may be suitably designed impedance elements (e.g., RC networks, RL networks, RLC networks, etc.) for the given implementation, for example, although other load configurations are also possible. That is, the first and second loads 35a, 35b and 36a, 36b may be fixed for desired performance with respect to the given operating frequency bands of the antenna elements 34, 33, respectively. In some embodiments, respective sets of loads need not be used for each antenna 33, 34, that is, the loads could be common to both antennas and switched thereto as desired depending upon the given operating mode. Moreover, the loads 35a, 35b and 36a, 36b may optionally be omitted in some embodiments.

In the example illustrated in FIG. 1, the signal processing circuitry 38 is connected to the transceiver 31, which is in turn connected to the antenna 33. Neither of the first or second loads 35a, 35b is connected to the antenna 33 in the illustrated active mode of this antenna, although in some embodiments one or more of the loads could be connected to the active antenna element, as will be appreciated by those skilled in the art. Moreover, with respect to the antenna element 34, which is in the passive mode (i.e., the signal processing circuitry 38 is not connected thereto via the transceiver 32), the first load 36a is connected to the antenna 34 while the second load 36b is not.

In other configurations, the second load 36b may also (or instead) be connected to the antenna element 34. Moreover, the transceiver 32 may also be selectively connected/disconnected as a load for the antenna element 34 in the passive mode, and the same is true for the transceiver 31 and antenna element 33. That is, the controller 37 may optionally selectively switch any of the passive antennas to an unused transceiver as an additional load, if desired, at Block 54, thus concluding the illustrated method (Block 55). Thus, it will be appreciated that different combinations of loads (including the transceivers 31, 32) may be connected to the antenna elements 33, 34 when they are in a passive mode to provide desired flexibility in shaping the signal characteristics of the active (radiating) antenna. Moreover, in some embodiments the antenna elements 33, 34 could be selectively connected/disconnected from ground 43' (see FIG. 2) when in the passive mode to provide a floating beam shaping element for the active antenna element, as will be appreciated by those skilled in the art.

It should be noted that the illustrated example is but one possible embodiment of a variable load passive/active antenna system, and that different numbers of transceivers, passive and active elements, and loads may be used, and that more than one load (or no load) may be connected to a given antenna element at a time. Furthermore, while the loads associated with a given antenna element will typically have different characteristics or values, some loads within the system may have similar values (e.g., the first loads 35a and 36a may have a same load value, etc.), although this need not be the case in all embodiments. In the example illustrated in FIG. 2, all of the loads 35a', 35b', 36a', 36b' have different respective values A, B, C, and D.

Generally speaking, desired performance of the parasitic element(s) may be obtained by switching the loading associated with the parasitic antenna element(s). Again, the transceiver(s) associated with the parasitic antenna element(s) at its off condition (i.e., when in the passive mode) may also be considered as another load for that particular parasitic element. As noted above, the controller 37 causes the parasitic antenna element to become a main or active antenna at a different band when the transceiver switches on, and the other antenna element(s) becomes the passive or parasitic element. The controller 37 may advantageously be implemented with one or more of a microprocessor, digital signal processor (DSP), memory, and/or associated software/computer instructions, for example, as will also be appreciated by those skilled artisan.

The loading selection may be based upon applicable gain and return loss conditions, operating frequency bands, and applicable SAR and/or HAC requirements, as will be further appreciated by those skilled in the art. More particularly, the loads may be tuned or selected to provide desired operating characteristics for a given frequency band based upon the applicable gain/return loss and/or SAR/HAC requirements. Also, it should be noted that while separate loads are shown for each antenna element in the present example for clarity of illustration, the load change between active and passive antenna modes may be accomplished using a single load with a tunable or selectable value.

Referring to FIGS. 4-7, an exemplary embodiment of a multi-band antenna system 60" which may be used in the mobile wireless communications device 30 is now described. The antenna system 60" advantageously provides coverage for a plurality of operating frequency bands, such as GSM/CDMA/WCDMA bands, for example, although operation with other bands is also possible, as will be appreciated by those skilled in the art. The antenna system 60" may therefore be used to achieve ultra-wide band design requirements by utilizing multiple antennas. Generally speaking, in this exemplary configuration the antennas have different structures. More particularly, the first antenna 33" is a quad band inverted F GSM antenna, and the second antenna 34" is a single band monopole WCDMA frequency division duplex (FDD) band antenna. However, in other embodiments the difference in antenna structure may be other than frequency type or antenna type. For example, the antennas may be of a same type (or operate in a same frequency band(s)), but be of different sizes or shapes. Moreover, the antennas may have different configurations, such as an internal vs. external antenna (see FIG. 2), printed element vs. a metallic or wire element, etc., as will be appreciated by those skilled in the art.

Figure 4:
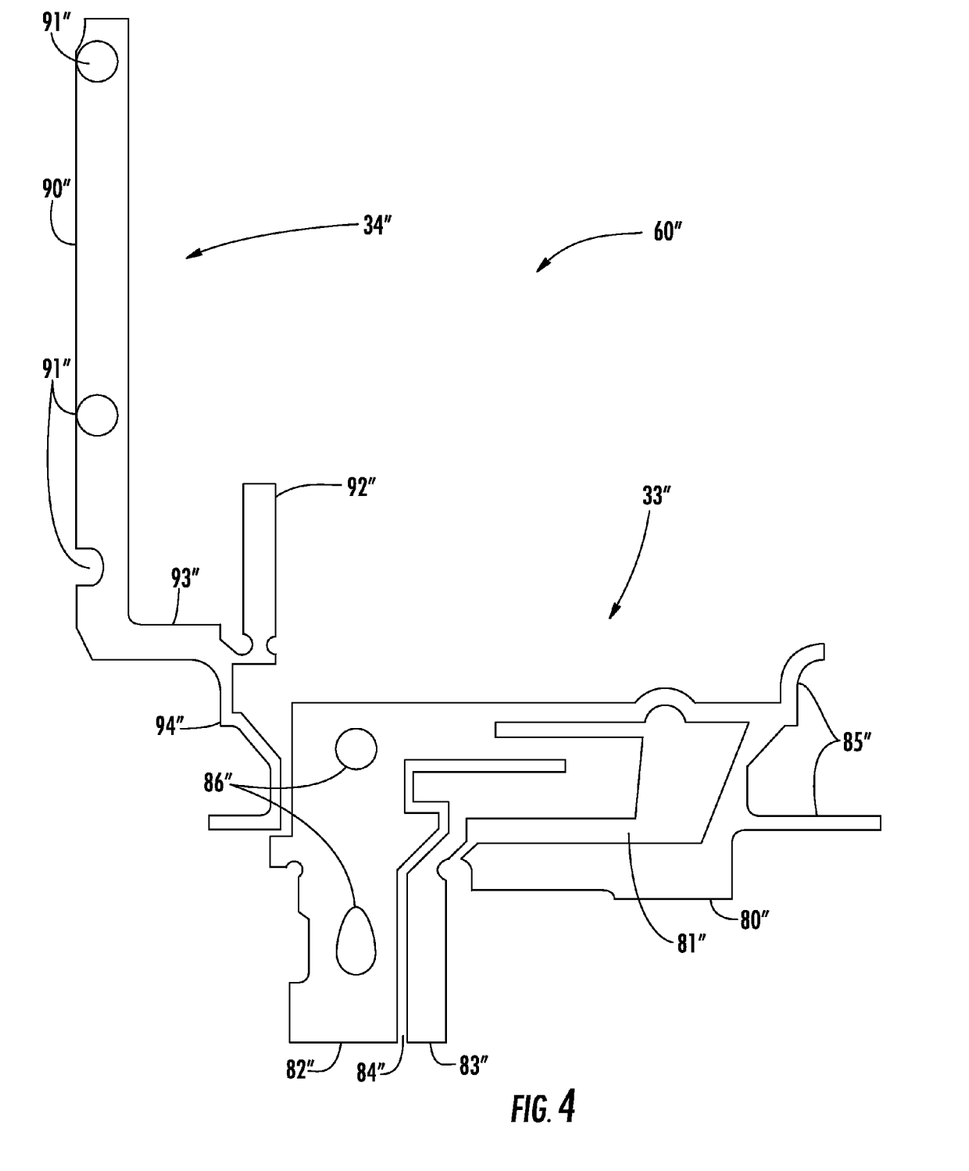
FIG. 4 is a plan view of an exemplary multi-band antenna system for use in the mobile wireless communications device of FIG. 1.

The antennas 33", 34" are strongly coupled together, and in the exemplary embodiment have a separation of less than 0.5 mm, although other separation distances may be used in different embodiments. As a result of the multiple antenna configuration, operation in the GSM850/900/1800/1900 and WCDMA 850/1900/2100 bands is advantageously provided in the exemplary embodiment.

Figure 5A:
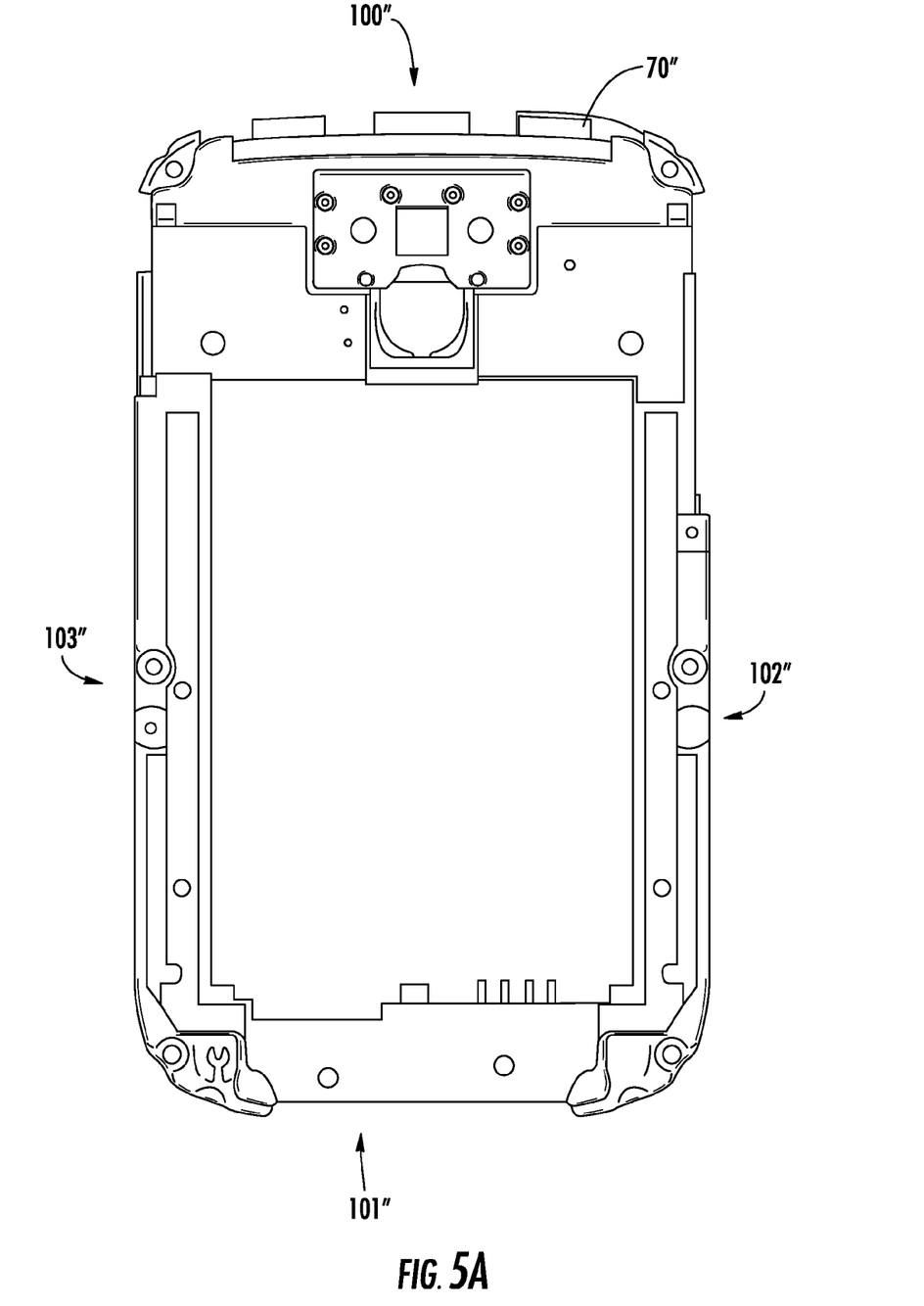
FIGS. 5A and 5B are front and rear views, respectively, of a mobile wireless communications device housing for use with the antenna system of FIG. 4.
Figure 5B:
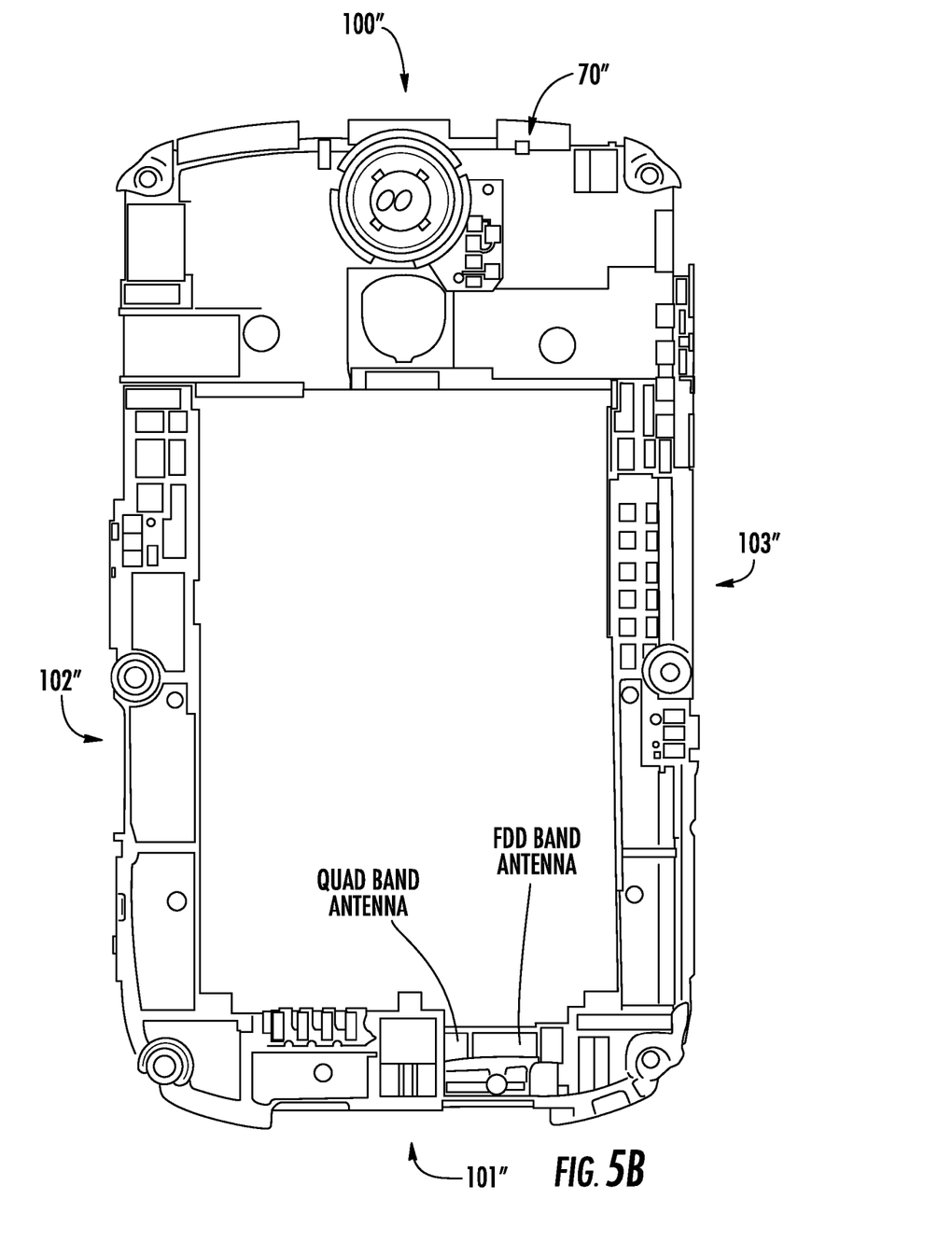

As noted above, the quad band antenna 33" is a planar inverted F (PIFA) antenna, and it illustratively includes a folded or U-shaped body portion 80" that defines a gap 81" therein. First and second arms 82", 83" extend outwardly from the body 80" and define a gap 84" therebetween. The arm 82" illustratively includes cut-outs or notches 86" to accommodate support structure in a device housing 70", but they may also be shaped for tuning purposes, as will be appreciated by those skilled artisan. The device housing 70" illustratively has opposing top and bottom ends 100", 101", and opposing sides 102", 103", as seen in FIGS. 5A and 5B. The antenna 33" is positioned at the bottom end 101" as shown.

The exemplary FDD band antenna 34" illustratively includes a first elongate portion 90" with cut-outs/notches 91" therein that extends along the side 103" of the housing 70'" from the bottom end 101" toward the top end 100". A second elongate portion 92" is generally parallel to the first elongate portion 91" and has a connector portion 93'" therebetween which, along with the first and second elongate portions, generally resembles a backwards "J" shape. In the illustrated example, the second elongate portion 92" is about ¼ of the length of the first elongate portion 90", although other lengths and configurations may also be used. Both the first and second elongate portions 90", 92" extend vertically along the length of the housing 70" (see FIG. 7). A partial loop portion 93" extends below the connector portion 93"', as shown. The antennas 33", 34" may be single or dual feed antennas based upon the given embodiment.

Figure 7:
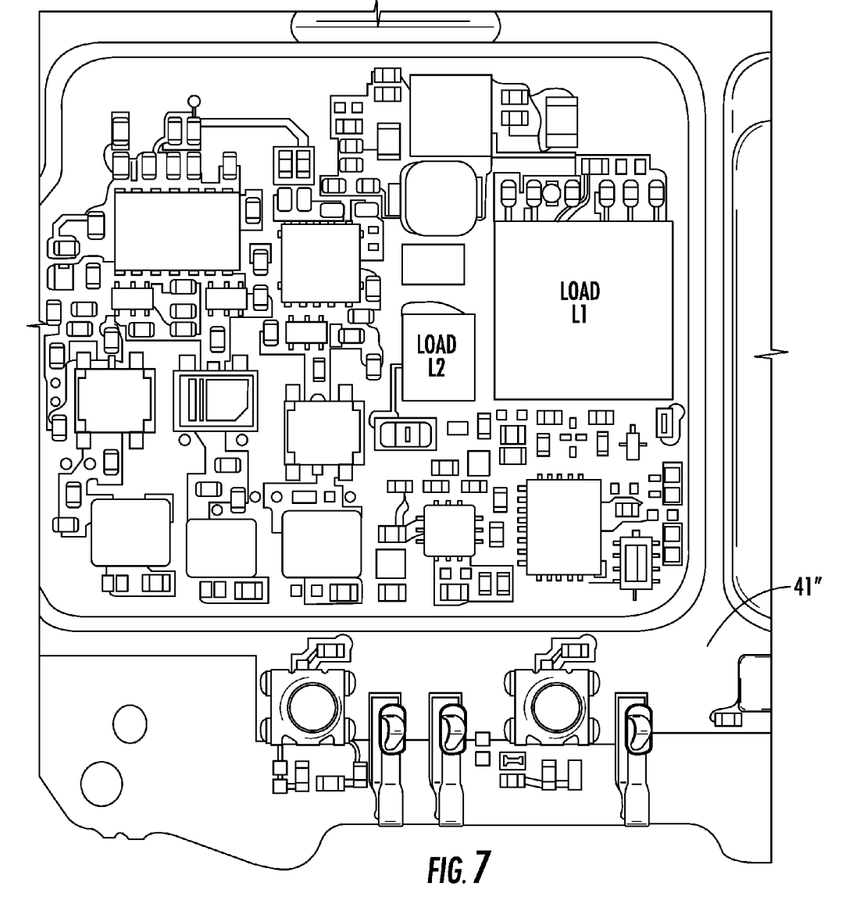
FIG. 7 is a top view of a mobile wireless communications device printed circuit board including the components schematically illustrated in FIG. 6.

As seen in FIGS. 5A and 5B, the antennas 33', 34' are carried on an inner surface of the housing 70", whereas the RF switches 71", 72", transceivers 31", 32", loads 35", 36", and associated controller/processor circuitry are carried on the PCB 41" (FIG. 7). However, in some embodiments one of both of the antennas 33', 34' may also be carried on the PCB or on an external portion of the housing 70".

Figure 6:
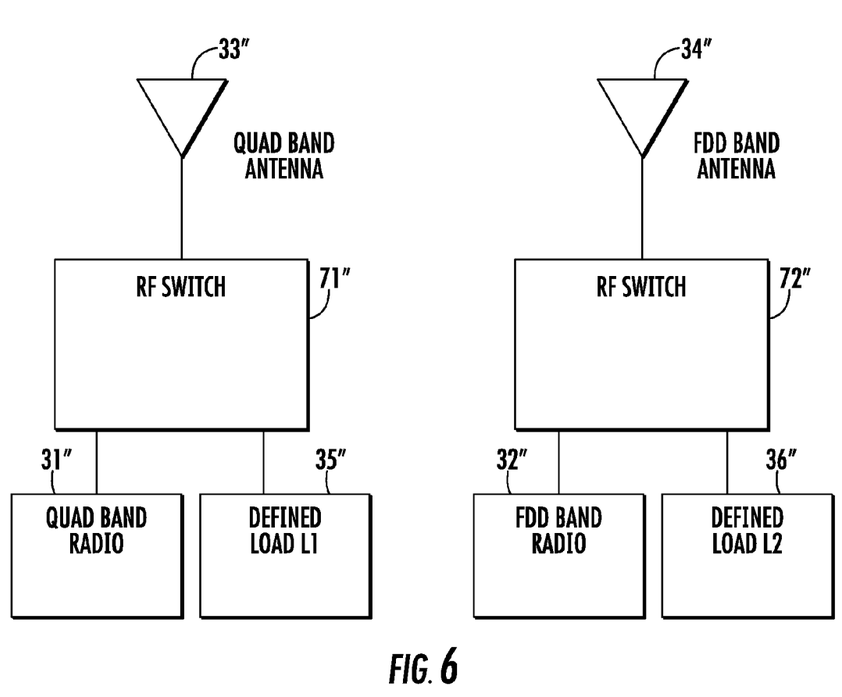
FIG. 6 is a schematic block diagram illustrating an antenna load-switching embodiment for the antenna system of FIG. 4.

As noted above, the exemplary housing or frame 70" for the antennas 33", 34" is shown in FIGS. 5A and 5B. A block diagram of an exemplary load-switching configuration for the antennas 33", 34" which illustratively includes RF switches 71", 72" for the antennas 33", 34", respectively, is shown in FIG. 6. While the quad-band antenna 33" is in operation, the FDD band antenna 34" is switched (i.e., connected) to the load impedance 36". On the other hand, while the FDD band antenna 34" is in operation, the quad-band antenna 33" is switched (i.e., connected) to the load impedance 35". By selectively switching the antennas 33", 34" to the load impedances 35", 36", desired radiated performance may be achieved. As discussed above, the loads 35", 36" are used to alter the load impedance of the parasitic coupling, so that when an appropriate coupling configuration is used desired antenna performance is achieved, as will be appreciated by those skilled in the art. Again, the quad band and FDD band radios (i.e., transceivers) 31", 32"' may also be selectively switched to their respective antennas 33", 34" for this purpose as well, as discussed above.

An exemplary layout of the antenna system 60" and radio front end circuitry on the PCB 41" is shown in FIG. 7. In this case, the load 35" (L1) is open circuited, and the load 36" (L2) is a shunt capacitor, although other load configurations may also be used. In some embodiments, the FDD band antenna 34" may advantageously be a multi-band antenna. In this case, the appropriate combination of the operating frequencies for each antenna 33", 34" may be selected to provide desired over-the-air (OTA), SAR, and/or HAG performance, as will be appreciated by those skilled in the art.

Figure 8:
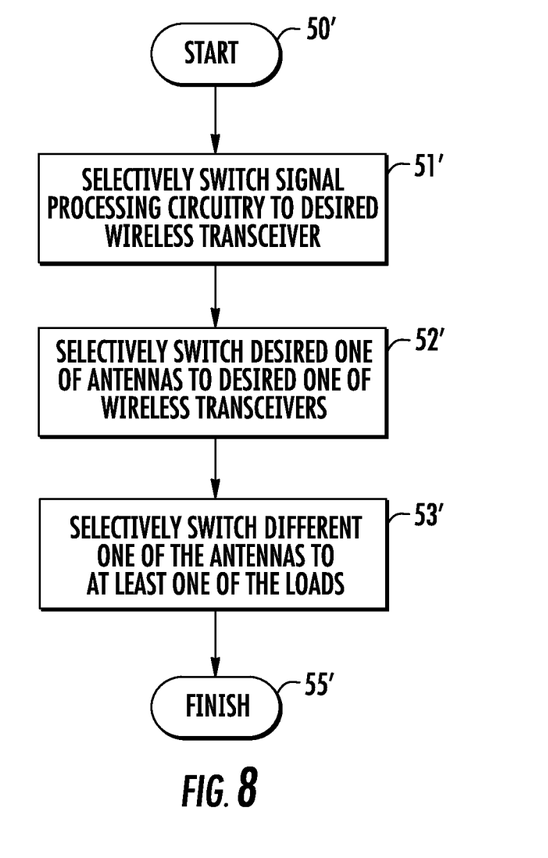
FIG. 8 is a flow diagram illustrating method aspects of using a mobile wireless communications device in accordance with another embodiment.

Referring to FIG. 8, an exemplary method for operating a mobile wireless communications device begins at Block 50' and illustratively includes selectively switching the signal processing circuitry 38 (see FIG. 1) to a desired one of the wireless transceivers 31", 32", at Block 51', and selectively switching a desired one of the antennas 33", 34" to the desired one of the wireless transceivers, at Block 52'. The method further illustratively includes selectively switching a different one of the antennas 33", 34" to at least one of the loads 35", 36", as discussed further above, at Block 53', thus concluding the illustrated method (Block 55').

Figure 9:
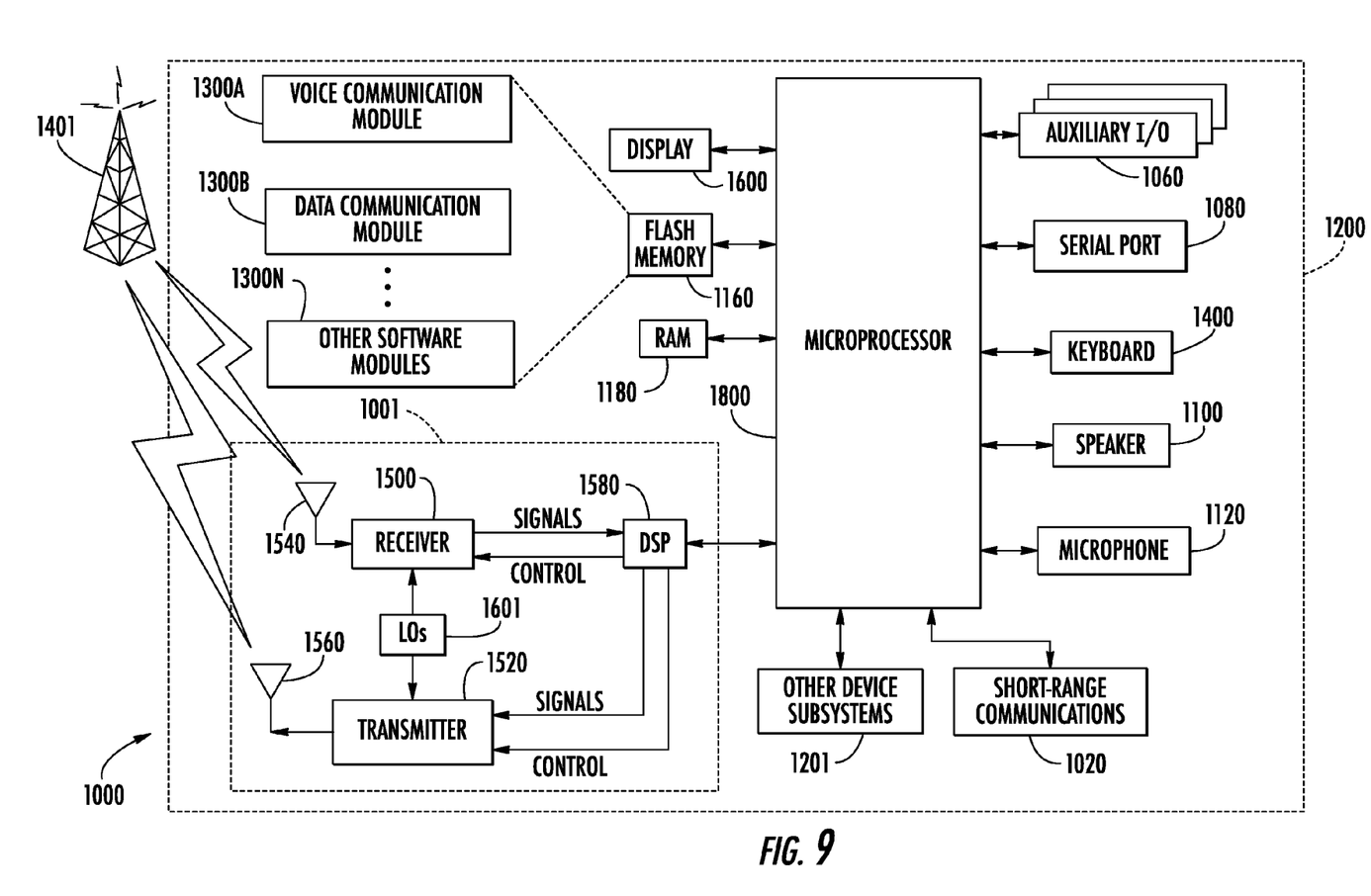
FIG. 9 is a schematic block diagram illustrating additional components that may be included in the mobile wireless communications device of FIG. 1.

Turning to FIG. 9, exemplary components that may be used in the device 30 are now described with reference to a handheld mobile wireless communications device 1000. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

In addition to the processing device 1800, other parts of the mobile device 1000 are shown schematically in FIG. 9. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. An electronic device comprising:
a monopole antenna;
a non-monopole antenna;
a plurality of wireless transceivers;
a plurality of loads;
signal processing circuitry; and
a controller configured to
switch said signal processing circuitry to a selected one of said wireless transceivers,
switch one of said monopole and non-monopole antennas to the selected one of said wireless transceivers, and
switch the other one of said monopole and non-monopole antennas to at least one of said loads.

2. The electronic device of claim 1 wherein said non-monopole antenna comprises an inverted F antenna.

3. The electronic device of claim 1 wherein at least one of said monopole and non-monopole antennas comprises a multi-band Global System for Mobile Communications (GSM) antenna.

4. The electronic device of claim 1 wherein at least one of said monopole and non-monopole antennas comprises a wideband code-division multiple access (WCDMA) frequency division duplex (FDD) band antenna.

5. The electronic device of claim 1 further comprising a portable housing having an inner surface carrying said monopole and non-monopole antennas.

6. The electronic device of claim 5 further comprising a printed circuit board (PCB) within said portable housing and carrying said wireless transceivers, said loads, said signal processing circuitry, and said controller.

7. The electronic device of claim 5 wherein said portable housing has opposing top and bottom ends and opposing first and second sides; and wherein at least one of said monopole and non-monopole antennas extends from the bottom end vertically upward toward the top end along at least one of the first and second sides.

8. The electronic device of claim 5 wherein said portable housing has opposing top and bottom ends and opposing first and second sides; and wherein at least one of said monopole and non-monopole antennas is carried adjacent the bottom end of said portable housing.

9. The electronic device of claim 1 wherein said plurality of loads comprises a plurality of impedance elements.

10. The electronic device of claim 1 wherein said plurality of loads comprises at least one respective load for each of said antennas.

11. An electronic device comprising:
a monopole antenna;
an inverted F antenna;
a plurality of wireless transceivers;
a plurality of impedance elements;
signal processing circuitry; and
a controller configured to
switch said signal processing circuitry to a selected one of said wireless transceivers,
switch one of said monopole and inverted F antennas to the selected one of said wireless transceivers, and
switch the other one of said monopole and inverted F antennas to at least one of said impedance elements.

12. The electronic device of claim 11 wherein said inverted F antenna comprises a multi-band Global System for Mobile Communications (GSM) antenna.

13. The electronic device of claim 11 wherein said monopole antenna comprises a wideband code-division multiple access (WCDMA) frequency division duplex (FDD) band antenna.

14. A method for operating an electronic device comprising monopole and non-monopole antennas, a plurality of wireless transceivers, a plurality of loads, and signal processing circuitry, the method comprising:
using a controller to switch the signal processing circuitry to a selected one of the wireless transceivers;
using the controller to switch one of the monopole and non-monopole antennas to the selected one of the wireless transceivers; and
using the controller to switch the other one of the monopole and non-monopole antennas to at least one of the loads.

15. The method of claim 14 wherein the non-monopole antenna comprises an inverted F antenna.

16. The method of claim 14 wherein at least one of the monopole and non-monopole antennas comprises a multi-band Global System for Mobile Communications (GSM) antenna.

17. The method of claim 14 wherein at least one of the monopole and non-monopole antennas comprises a wideband code-division multiple access (WCDMA) frequency division duplex (FDD) band antenna.

18. An electronic device comprising:
an inverted F antenna;
a non-inverted F antenna;
a plurality of wireless transceivers;
a plurality of loads;
signal processing circuitry; and
a controller configured to
  switch said signal processing circuitry to a selected one of said wireless transceivers,
  switch one of said inverted F and non-inverted F antennas to the selected one of said wireless transceivers, and
  switch the other one of said inverted F and non-inverted F antennas to at least one of said loads.

19. The electronic device of claim 18 wherein said plurality of loads comprises a plurality of impedance elements.

20. A method for operating an electronic device comprising inverted F and non-inverted F antennas, a plurality of wireless transceivers, a plurality of loads, and signal processing circuitry, the method comprising:
  using a controller to switch the signal processing circuitry to a selected one of the wireless transceivers;
  using the controller to switch one of the inverted F and non-inverted F antennas to the selected one of the wireless transceivers; and
  using the controller to switch the other one of the inverted F and non-inverted F antennas to at least one of the loads.

* * * * *